Patented Nov. 9, 1943

2,333,635

UNITED STATES PATENT OFFICE 2,333,635

METHOD OF POLYMERIZING VINYL COMPOUNDS

Edgar C. Britton and Walter J. Le Fevre, Midland, Mich., assignors to The Dow Chemical Company, Midland, Mich., a corporation of Michigan No Drawing. Application August 3, 1940, Serial No. 351,225

15 Claims. (Cl. 260—63)

This invention concerns an improved method of polymerizing certain vinyl and vinylidene compounds.

A co-pending application of J. W. Britton and R. C. Dosser, Serial No. 351,220, filed August 3, 1940, discloses certain new complex catalysts which are exceptionally effective in promoting the polymerization of vinyl and vinylidene compounds. The complex catalysts are mixtures comprising an acid, a per-oxygen compound, and a ferric compound. In said co-pending application it is shown that such mixture is far more effective than any of its ingredients in catalyzing the polymerization of vinyl and vinylidene compounds, but that in order to obtain the best results when using the complex catalysts, other polymerizing conditions must be varied to suit the particular vinyl or vinylidene compound under treatment.

We have found that the above-mentioned complex catalysts, although exceptionally effective in promoting the polymerization of vinyl and vinylidene compounds, are peculiarly sensitive to the particular combinations of vinyl or vinylidene compound and reaction medium employed and that certain of such combinations tend to inhibit polymerization, even though the catalyst be used. For instance, the polymerization of vinyl cyanide with such complex catalyst occurs rapidly when carried out in aqueous methanol, but takes place sluggishly when carried out in an aqueous emulsion. In contrast, the polymerization of vinylidene chloride with the complex catalyst occurs rapidly if carried out in aqueous emulsion, but only sluggishly if carried out using aqueous methanol as a reaction solvent. The cause of this phenomenon is not known.

We have further found that, when using the new complex catalysts for the polymerization of vinyl and vinylidene compounds having the general formula:

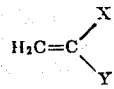

wherein X represents hydrogen or an alkyl substituent and Y represents a substituent selected from the class consisting of nitrile, alkyl-carbonyl, and alkoxy-carbonyl substituents, the polymerization occurs unusually rapidly and completely if carried out in the presence of a mutual solvent for the polymerizable compound and the catalyst. As hereinbefore stated the use of such solvent interferes with the polymerization of various other polymerizable compounds in the presence of the same catalyst.

Examples of vinyl and vinylidene compounds having the above general formula which may advantageously be polymerized in solution using the new complex catalysts are methyl acrylate, ethyl acrylate, methyl methacrylate, ethyl methacrylate, propyl methacrylate, methyl alpha-ethyl-acrylate, methyl vinyl ketone, methyl alpha-ethyl-vinyl ketone, ethyl vinyl ketone, ethyl alpha-ethyl-vinyl ketone, vinyl cyanide, alpha-methyl acrylic acid nitrile, etc.

As hereinbefore indicated, the complex catalysts employed to promote the polymerization comprise as their essential ingredients an acid, a per-oxygen compound capable of supplying nascent oxygen in the polymerization mixture, and a ferric compound. The kinds and proportions of acid, per-oxygen compound, and ferric compound employed as catalyst ingredients may be varied widely. Any water-soluble acid of strength sufficient to render the reaction mixture definitely acidic may be used as the acid ingredient. Examples of such acids are nitric acid, hydrochloric acid, sulphuric acid, benzene sulphonic acid, acetic acid, chloro-acetic acid, etc. The acid is employed in amount sufficient to reduce the pH value of the reaction mixture to below 6 and preferably between 1.5 and 3. Best results are usually obtained when employing nitric acid in the proportions just stated as the acid ingredient of the catalyst.

Any peroxide may be used as a catalyst ingredient but hydrogen peroxide is preferred. Other per-oxygen compounds which may be employed are benzoyl peroxide, sodium or potassium perborate, peracetic acid, and metal peroxides such as sodium or barium peroxide which may be reacted with the acid to form hydrogen peroxide in situ, etc. Between 0.002 and 0.2 mole of peroxide is usually employed per mole of the vinyl or vinylidene compound to be polymerized, but the peroxide may be used in smaller or considerably larger proportions if desired.

Examples of ferric compounds which may be employed as catalyst ingredients are ferric nitrate, ferric chloride, ferric sulphate, ferric acetate, ferric salts of sulphonic acids, e. g. sulphonated sperm oil, etc. The proportion of ferric compound in the reaction mixture is preferably very small; between 0.0001 and 0.05 per cent by weight of iron relative to the vinyl or vinylidene compound is usually employed. However, smaller or somewhat larger proportions of the ferric compound may be used.

From the foregoing statements it will be seen that the proportions of the several catalyst ingredients with respect to one another may be varied over wide ranges. However, we usually employ the ferric compound and the peroxide in relative proportions corresponding to between about 0.000001 and 0.0004 gram atom of iron per mole of the peroxide. As hereinbefore stated the acid is advantageously used in amount sufficient to lower the pH value of the reaction mixture to below 6 and preferably to between 1.5 and 3.

Any inert solvent capable of dissolving both the polymerizable compound and the complex catalyst may be used as a reaction medium. Examples of solvents which have proven useful as such medium are aqueous methanol, aqueous ethanol, aqueous propanol, dioxane, etc.

In carrying out the polymerization, the vinyl compound and the several catalyst ingredients in the relative proportions above stated are dissolved in any desired order in the solvent and the solution is brought to a temperature sufficient to cause polymerization. The polymerization is preferably carried out in a closed container or in contact with nitrogen, carbon dioxide or other inert gas, since molecular oxygen, if absorbed in large quantity, may cause discoloration of the product. In most instances the polymerization is carried out at temperatures between 30° C. and 100° C., but in some instances it may be carried out at temperatures as low as −10° C. Temperatures above 100° C. may be employed. After completing the polymerization the product is separated from the mixture in the usual manner, e. g. by distilling off the solvent, preferably under vacuum, or by treating the solution with water to precipitate the polymer. In many instances the product solidifies as it is formed and may be separated mechanically from the mixture, e. g. by filtration or by decanting.

The following table gives the results obtained in polymerizing several vinyl compounds while in solution, using a complex catalyst comprising an acid, a peroxide and a ferric compound, as required by the invention. For purpose of comparison, the table includes other experiments carried out in like manner, except that certain ingredients of the complex catalyst were omitted. In each experiment, the polymerizable compound named was dissolved in an equal weight of the solvent, also named, the solution was treated with a small amount of hydrogen peroxide and then heated in a closed container to effect the polymerization. In runs 1–6, 10 and 11 of the table the reaction mixture initially contained hydrogen peroxide in amount corresponding to 2 per cent of the weight of the polymerizable compound, whereas in runs 7–9 the hydrogen peroxide was used in amount corresponding to only 1 per cent of the weight of the polymerizable compound. In the experiments carried out under acidic conditions, nitric acid or acetic acid was employed in amount sufficient to reduce the pH value of the solution to approximately 2. In those experiments wherein a ferric compound also was present, ferric chloride was used in amount corresponding to 0.004 per cent of the weight of the solution. The table indicates which catalyst ingredients were employed in each experiment. It also gives the time-temperature conditions employed in carrying out each polymerization and gives the per cent yield of the polymer based on that theoretically obtainable. The methanol mentioned as a solvent in the table was aqueous methanol of 85 per cent by weight concentration.

Table

| Run No. | Polymerizable compound | Solvent | Catalyst ingredient | Polymerizing conditions | | Yield of polymer, per cent |
|---|---|---|---|---|---|---|
| | | | | Time, hours | Temp., °C. | |
| 1 | Vinyl cyanide | Methanol | $H_2O_2$ | 7 | 40 | Nil |
| 2 | do | do | $H_2O_2 + HNO_3$ | 7 | 40 | Nil |
| 3 | do | do | $H_2O_2 + HNO_3 + FeCl_3$ | 7 | 40 | 77 |
| 4 | do | Dioxane | $H_2O_2$ | 7.75 | 40 | 1.6 |
| 5 | do | do | $H_2O_2 +$ acetic acid | 7.75 | 40 | Nil |
| 6 | do | do | $H_2O_2 +$ acetic acid $+ FeCl_3$ | 7.75 | 40 | 47.1 |
| 7 | Methyl methacrylate | Methanol | $H_2O_2$ | 7 | 40 | Nil |
| 8 | do | do | $H_2O_2 + HNO_3$ | 7 | 40 | Nil |
| 9 | do | do | $H_2O_2 + HNO_3 + FeCl_3$ | 7 | 40 | 24.3 |
| 10 | Methyl isopropenyl ketone | do | $H_2O_2 + HNO_3$ | 14.5 | 40 | 2.6 |
| 11 | do | do | $H_2O_2 + HNO_3 + FeCl_3$ | 14.5 | 40 | 6.5 |

From the data in the foregoing table it will be seen that the complex catalyst, comprising an acid, a peroxide, and a ferric compound, is far more effective than either the peroxide alone or a mixture of the peroxide and acid in promoting the polymerizations.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises dissolving a polymerizable compound having the general formula:

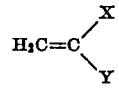

wherein X represents a substituent selected from the group consisting of hydrogen and alkyl substituents and Y represents a substituent selected from the group consisting of nitrile, alkyl-carbonyl, and alkoxy-carbonyl substituents, together with minor proportions of a water-soluble acid, a per-oxygen compound, and a ferric compound in an inert solvent and polymerizing the vinyl compound while in the solution.

2. The method which comprises dissolving a polymerizable compound having the general formula:

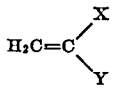

wherein X represents a substituent selected from the group consisting of hydrogen and alkyl substituents and Y represents a substituent of the group consisting of nitrile, alkyl-carbonyl, and alkoxy-carbonyl substituents, together with minor proportions of a water-soluble acid, a peroxide, and a ferric compound in an inert solvent and polymerizing the vinyl compound while in the solution.

3. In a method of polymerizing a polymerizable compound having the general formula:

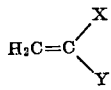

wherein X represents a substituent selected from the group consisting of hydrogen and alkyl substituents and Y represents a substituent selected from the group consisting of nitrile, alkyl-carbonyl, and alkoxy-carbonyl substituents, the steps of forming a solution of the vinyl compound, a water-soluble acid, a peroxide, a ferric compound, and an inert solvent, the acid being present in amount sufficient to reduce the pH value of the solution to below 6, the peroxide being present in amount corresponding to between 0.002 and 0.2 of the molecular equivalent of the vinyl compound, and the ferric compound being present in amount corresponding to between 0.0001 and 0.05 per cent of the weight of the vinyl compound, and polymerizing the latter while in the solution.

4. In a method of polymerizing a polymerizable compound having the general formula:

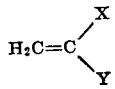

wherein X represents a substituent selected from the group consisting of hydrogen and alkyl substituents and Y represents a substituent selected from the group consisting of nitrile, alkyl-carbonyl and alkoxy-carbonyl substituents, the steps of forming a solution containing the vinyl compound and relatively small proportions of a water-soluble acid, hydrogen peroxide, and a ferric compound all dissolved in an inert solvent, and polymerizing the vinyl compound while in the solution.

5. In a method of polymerizing a polymerizable compound having the general formula:

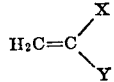

wherein X represents a substituent selected from the group consisting of hydrogen and alkyl substituents and Y represents a substituent selected from the group consisting of nitrile, alkyl-carbonyl and alkoxy-carbonyl substituents, the steps of forming a solution of the vinyl compound and of relatively small proportions of nitric acid, hydrogen peroxide, and a ferric compound, all dissolved in an inert solvent, and polymerizing the vinyl compound while in the solution.

6. In a method of polymerizing a polymerizable compound having the general formula:

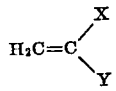

wherein X represents a substituent selected from the group consisting of hydrogen and alkyl substituents and Y represents a substituent selected from the group consisting of nitrile, alkyl-carbonyl and alkoxy-carbonyl substituents, the steps of dissolving the vinyl compound and minor proportions of nitric acid, hydrogen peroxide, and a ferric compound in aqueous methanol to form a solution containing the acid in amount sufficient to reduce the pH value of the solution to between 1.5 and 3, the hydrogen peroxide in amount corresponding to between 0.002 and 0.2 of the molecular equivalent of the vinyl compound, and the ferric compound in amount such that its iron content corresponds to between 0.0001 and 0.05 per cent of the weight of the vinyl compound, polymerizing the latter while in the solution and separating the polymerized product.

7. The method which comprises dissolving vinyl cyanide and relatively small proportions of a water-soluble acid, a peroxide, and a ferric compound in a solvent and polymerizing the vinyl cyanide while in the solution.

8. The method which comprises dissolving vinyl cyanide and relatively small proportions of a water-soluble acid, hydrogen peroxide, and a ferric compound in aqueous methanol and polymerizing the vinyl cyanide while in the solution.

9. The method which comprises dissolving vinyl cyanide, nitric acid, hydrogen peroxide, and a ferric compound in aqueous methanol to form a solution containing sufficient nitric acid to reduce the pH value of the solution to between 1.5 and 3, hydrogen peroxide in amount corresponding to between 0.002 and 0.2 of the molecular equivalent of the vinyl cyanide, and the ferric compound in amount such that its iron content corresponds to between 0.0001 and 0.05 per cent of the weight of the vinyl cyanide, polymerizing the latter while in the solution, and separating the polymerized product.

10. The method which comprises dissolving methyl methacrylate and relatively small proportions of a water-soluble acid, a peroxide, and a ferric compound in a solvent and polymerizing the methyl methacrylate while in the solution.

11. The method which comprises dissolving methyl methacrylate and relatively small proportions of a water-soluble acid, hydrogen peroxide, and a ferric compound in aqueous methanol and polymerizing the methyl methacrylate while in the solution.

12. The method which comprises dissolving methyl methacrylate, nitric acid, hydrogen peroxide, and a ferric compound in aqueous methanol to form a solution containing sufficient nitric acid to reduce the pH value of the solution to between 1.5 and 3, hydrogen peroxide in amount corresponding to between 0.002 and 0.2 of the molecular equivalent of the methyl methacrylate, and the ferric compound in amount such that its iron content corresponds to between 0.0001 and 0.05 per cent of the weight of the methyl methacrylate, polymerizing the latter while in the solution and separating the polymerized product.

13. The method which comprises dissolving methyl isopropenyl ketone and relatively small proportions of a water-soluble acid, a peroxide, and a ferric compound in a solvent and polymerizing the methyl isopropenyl ketone while in the solution.

14. The method which comprises dissolving methyl isopropenyl ketone and relatively small proportions of a water-soluble acid, hydrogen peroxide, and a ferric compound in aqueous methanol and polymerizing the methyl isopropenyl ketone while in the solution.

15. The method which comprises dissolving methyl isopropenyl ketone, nitric acid, hydrogen peroxide, and a ferric compound in aqueous methanol to form a solution containing sufficient nitric acid to reduce the pH value of the solution to between 1.5 and 3, hydrogen peroxide in amount corresponding to between 0.002 and 0.2 of the molecular equivalent of the isopropenyl ketone, and the ferric compound in amount such that its iron content corresponds to between 0.0001 and 0.05 per cent of the weight of the methyl isopropenyl ketone, polymerizing the latter while in the solution, and separating the polymerized product.

EDGAR C. BRITTON.
WALTER J. LE FEVRE.